July 8, 1941.   H. BISHER   2,248,803
OIL RETAINING PLATE
Filed June 28, 1939   2 Sheets-Sheet 1

INVENTOR
Hemel Bisher
BY
ATTORNEY

July 8, 1941.

H. BISHER 2,248,803

OIL RETAINING PLATE

Filed June 28, 1939

INVENTOR
Hemel Bisher
BY
ATTORNEY

Patented July 8, 1941

2,248,803

UNITED STATES PATENT OFFICE 2,248,803

OIL RETAINING PLATE

Hemel Bisher, New York, N. Y.

Application June 28, 1939, Serial No. 281,637

4 Claims. (Cl. 286—5)

This invention relates to new and useful improvements in oil retaining plates and an oil feeding tank for ship bearings.

The invention has for an object the association of an oil tank with a housing of a large bearing arranged in a manner to supply oil to that portion of the shaft passing through the bearing.

Still further the invention contemplates an arrangement for retrieving the oil as it flows through the bearing so that it may be reused.

Another object of this invention resides in the provision of novel retaining plates associated with the ends of the housing of the bearing in a manner to catch oil thrown by the shaft rotating in the bearing.

Still further the invention proposes the construction of a device as mentioned which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
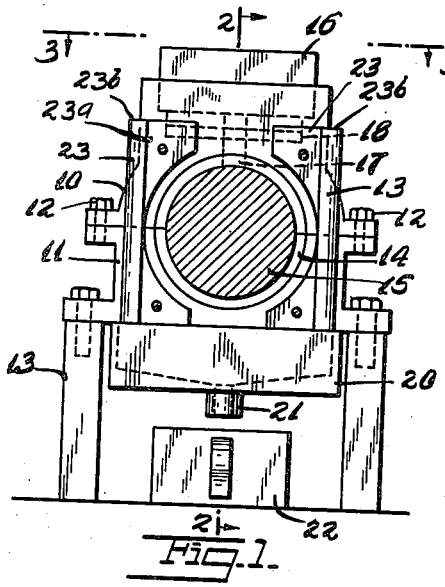
Fig. 1 is an end elevational view of a bearing with a shaft shown in cross section, equipped with oil retaining plates and an oil feeding tank in accordance with this invention.
Figure 2:
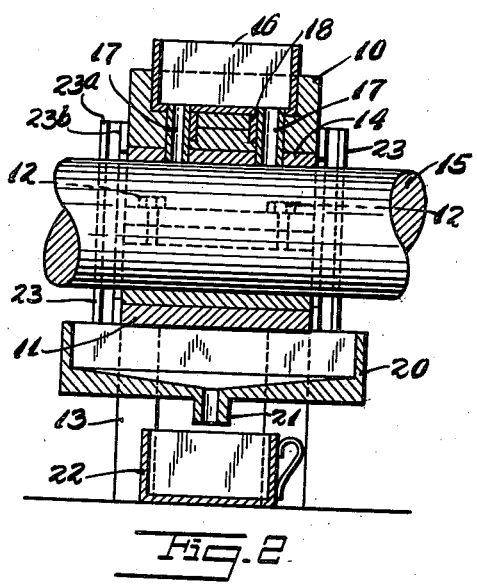
Fig. 2 is a vertical sectional view taken on the line 2—2 of Fig. 1.
Figure 3:
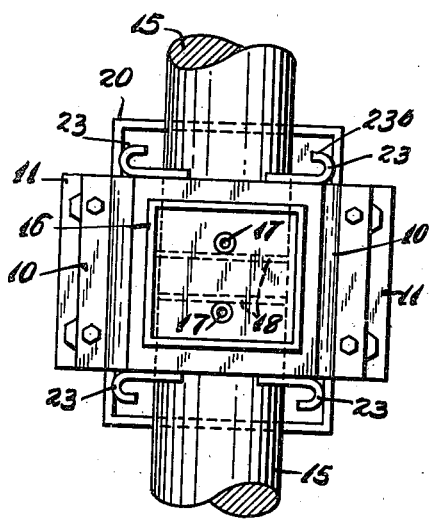
Fig. 3 is a plan view looking in the direction of the line 3—3 of Fig. 1.

The oil retaining plates and oil feeding tank for ship bearings in accordance with this invention includes a split bearing housing having an upper part 10 and a lower part 11 removably connected together by bolts 12. This bearing housing is shown mounted on a suitable foundation 13. Babbitt material 14 lines the bearing housing. A shaft 15 rotatively engages through the bearing.

An oil feeding tank 16 is mounted upon the top of the housing section 10 and has oil feeding pipes 17 extending through openings in the housing section 10 so as to discharge upon the top of the shaft 15. On the bottom of the tank there are several flanges 18 which extend downwards and engage in complementary recesses formed in the housing section 10, by which the tank is securely mounted in position.

A drain pan 20 is disposed beneath the bearing housing 10, 11 in an open portion of the foundation 13. This drain pan is provided with a drain outlet pipe 21. A vessel 22 is arranged beneath the drain pan and directly beneath the outlet pipe 21 for receiving and catching the discharged oil.

Oil retaining plates 23 are mounted on the ends of the housing 10, 11 and extend vertically along the sides of the shaft 15. Each of these retaining plates comprises a flange portion 23$^a$ which is fastened to the end of the bearing housing by fastening elements, welding, or if desired by an integral construction. These flange portions 23$^a$ continue into inwardly turned edge portions 23$^b$. The arrangement is such that oil discharged from the pipe 17, when worked down along the shaft 15, and outwards to the end of the housing 10, 11, and is thrown by centrifugal force outwards, upon reaching the end of the housing, this oil, will be caught by the retaining plates 23. The oil will first strike the portions 23$^b$ and then flow downwards along the retaining plates and finally drip into the pan 20.

In Figs. 4 to 11 inclusive, a modified form of the invention has been disclosed which distinguishes from the prior form in the construction of the oil feeding tank and in the construction of the oil retaining plates. According to this form of the invention, the oil feeding tank 16' is arranged longitudinally along the center of the top section 10 of the bearing housing. In the prior form, the oil feeding tank was arranged transversely across the bearing housing. This tank 16' is also provided with oil discharging tubes 17' arranged along the top of the shaft 15. The tank 16' is also provided with flanges 18' adapted to engage corresponding recesses formed in the bearing housing.

Figures 8, 9:
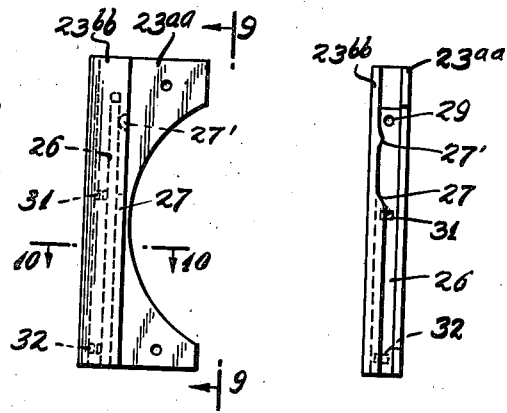
Fig. 8 is an enlarged elevational view of one of the oil retaining plates shown in Fig. 4.
Fig. 9 is an elevational view looking in the direction of the line 9—9 of Fig. 8.

Each oil retaining plate 23′, in accordance with this form of the invention, includes a flange portion 23$^{aa}$ adapted to be secured to the end of the bearing housing and continuing into a turn portion 23$^{bb}$. An auxiliary strip 26 is disposed within each turn portion 23$^{bb}$, and normally is in the position as shown in Figs. 8 and 9. The edge of the turn portion 23$^{bb}$ is formed with an inwardly directed flange 23$^{cc}$, see Fig. 10. This flange extends from the bottom of the oil retaining plate to the point 27 indicated in Fig. 9. At an area above this midway point 27, there is an additional projection 27′ similar to the projecting portion 23$^{cc}$. These inturned portions serve to hold the auxiliary retaining strip 26 in position within the turn portion 23$^{bb}$ of each retaining plate.

Figure 4:
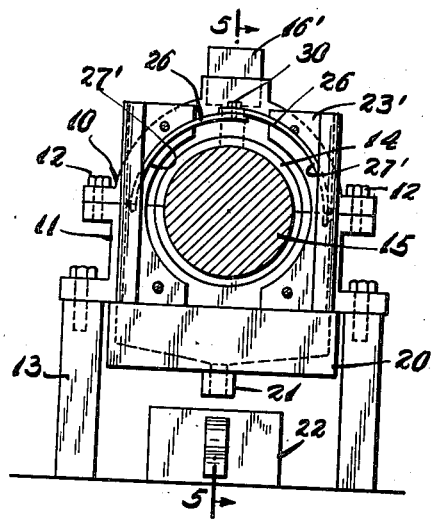
Fig. 4 is an elevational view similar to Fig. 1 but illustrating a modified form of the invention.
Figure 5:
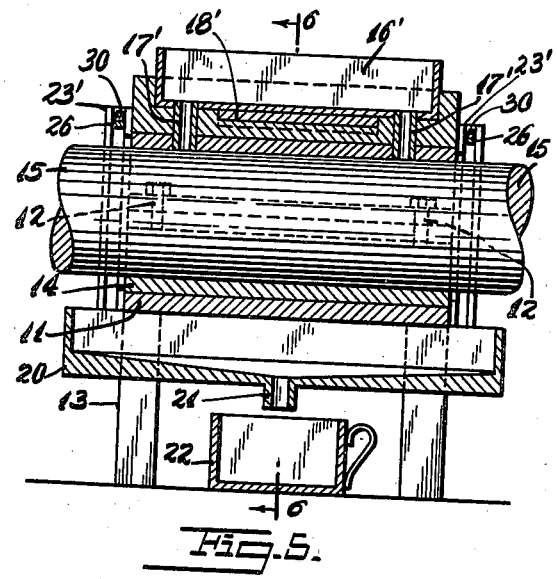
Fig. 5 is a vertical sectional view taken on the line 5—5 of Fig. 4.
Figure 6:
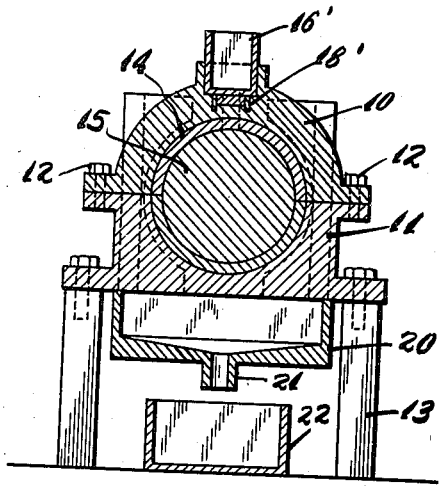
Fig. 6 is a sectional view taken on the line 6—6 of Fig. 5.
Figure 7:
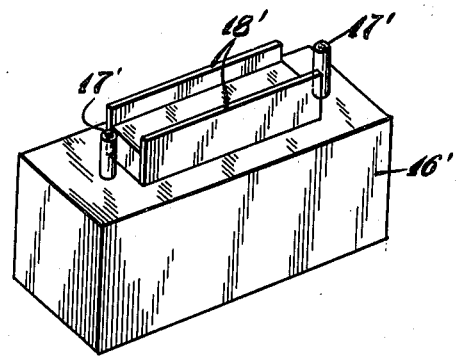
Fig. 7 is a perspective view of the oil tank illustrated in Fig. 5 but shown turned upside down so that the bottom may be clearly viewed.
Figure 10:
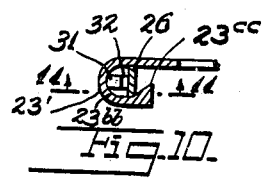
Fig. 10 is a horizontal sectional view taken on the line 10—10 of Fig. 8.
Figure 11:
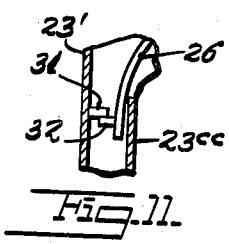
Fig. 11 is a sectional view taken on the line 11—11 of Fig. 10 but showing the parts in a different position.

If it is found that the bearing is throwing oil upwards over the top ends of the oil retaining plates, then the auxiliary retaining strips 26 are extended and connected together as shown in Fig. 4. The upper end of each auxiliary strip 26 is formed with an opening 29 through which the holding bolt 30 may be engaged.

Projections 31 and 32 are arranged respectively on each oil retaining plate 23′ and each auxiliary strip 26 in a manner so as to limit the extension of the auxiliary strip. In the retracted position of the auxiliary strip 26 as shown in Figs. 8 and 9, the projections 31 and 32 do not contact each other. However when the auxiliary strips 26 are pulled outwards to fully extended positions, the projections 31 and 32 engage each other and limit further extension of the strips 26, see Fig. 11.

The strips 26 in their raised positions are adapted to be bent over the points 27′ as indicated in Fig. 4. The free ends of the strips 26 may be then overlapped and the bolt 30 engaged through these parts as shown in Fig. 4. Any oil which is thrown upwards by the bearing, will strike the auxiliary strips and flow down along the bottom faces of the strips, and then along the retaining plates 23′ and finally discharge into the pan 20 from which the oil flows and collects in the container 22.

It is to be understood that the cans or containers may be of any shape and size, also that the tubes can be eliminated and substituted by two or more holes in the bottom of the container.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a device of the class described, oil retaining plates, each retaining plate comprising a flange portion and an inwardly turned portion continuing from said flange portion and said inwardly turned portions being directed towards each other, and an auxiliary oil retaining strip disposed between the adjacent faces of said flange portion and said inwardly turned portion of each retaining plate, means for slidably holding said strips in position on said plates, means for limiting upward extension of said auxiliary strips, and means for securing together the extended ends of adjacent strips when extended upwards between the top ends of said plates.

2. In a device of the class described, oil retaining plates, each retaining plate comprising a flange portion and an inwardly turned portion continuing from said flange portion and said inwardly turned portions being directed towards each other, and an auxiliary oil retaining strip disposed between the adjacent faces of said flange portion and said inwardly turned portion of each retaining plate, means for slidably holding said strips in position on said plates, means for limiting upward extension of said auxiliary strips, and means for securing together the extended ends of adjacent strips when extended upwards between the top ends of said plates, said means for slidably supporting said strips, comprising an inwardly directed flange formed on the free edge of the inwardly turned portion of each of said retaining plates to reduce the space between the adjacent faces of said flange portion and said inwardly turned portion to form a track for each of said strips.

3. In a device of the class described, oil retaining plates, each retaining plate comprising a flange portion and an inwardly turned portion continuing from said flange portion and said inwardly turned portions being directed towards each other, and an auxiliary oil retaining strip disposed between the adjacent faces of said flange portion and said inwardly turned portion of each retaining plate, means for slidably holding said strips in position on said plates, means for limiting upward extension of said auxiliary strips, and means for securing together the extended ends of adjacent strips when extended upwards between the top ends of said plates, said limiting means, comprising a projection formed on the back face of each of said retaining strips, and a complementary projection mounted on an intermediate portion of each of said plates adjacent the top thereof and engageable by said projection in the extended position of said strip.

4. In a device of the class described, oil retaining plates, each retaining plate comprising a flange portion and an inwardly turned portion continuing from said flange portion and said inwardly turned portions being directed towards each other, and an auxiliary oil retaining strip disposed between the adjacent faces of said flange portion and said inwardly turned portion of each retaining plate, means for slidably holding said strips in position on said plates, means for limiting upward extension of said auxiliary strips, and means for securing together the extended ends of adjacent strips when extended upwards between the top ends of said plates, said means for securing together the ends of said strips, comprising bolts engageable through aligned openings formed in the overlapped ends of said strips.

HEMEL BISHER.